Nov. 3, 1942.   E. M. McELHINNEY ET AL   2,301,133
MANUALLY CONTROLLABLE AND ADJUSTABLE SPEED
CONTROLLING MEANS FOR TRACTORS
Filed April 30, 1941   3 Sheets-Sheet 3

Inventors
Eric M. McElhinney &
James A. Podhajsky,
By G.C. Kennedy
Attorney

Patented Nov. 3, 1942

2,301,133

UNITED STATES PATENT OFFICE 2,301,133

MANUALLY CONTROLLABLE AND ADJUSTABLE SPEED CONTROLLING MEANS FOR TRACTORS

Eric M. McElhinney, Geneseo Township, Tama County, and James A. Podhajsky, Perry Township, Tama County, Iowa Application April 30, 1941, Serial No. 391,036

5 Claims. (Cl. 74—11)

This invention relates to improvements in tractors, and an object of said improvements is to combine with a tractor, mechanisms in train therewith adapted for manual manipulation by a driver for special uses thereof.

An object of our improvements is to include in such mechanisms adjustably mounted chain-driven sprocket gears of equal diameter, and removable as desired for the substitution of other sprocket gears, whereby the shafts of the gears may be rotated at the same speed, or with replacements by other gears permitting either gear to be either increased or diminished in size or in speed of rotation, as desired.

Another object of our invention is to provide for manual use by a driver, manually controllable devices in train, mechanically associated with said gears, and for variation of speed thereof.

Other improvements in details will be described hereinafter.

In the accompanying drawings, our added mechanisms are shown as mounted on a tractor of a well-known type, but the tractor is not as such claimed herein.

Figure 1:
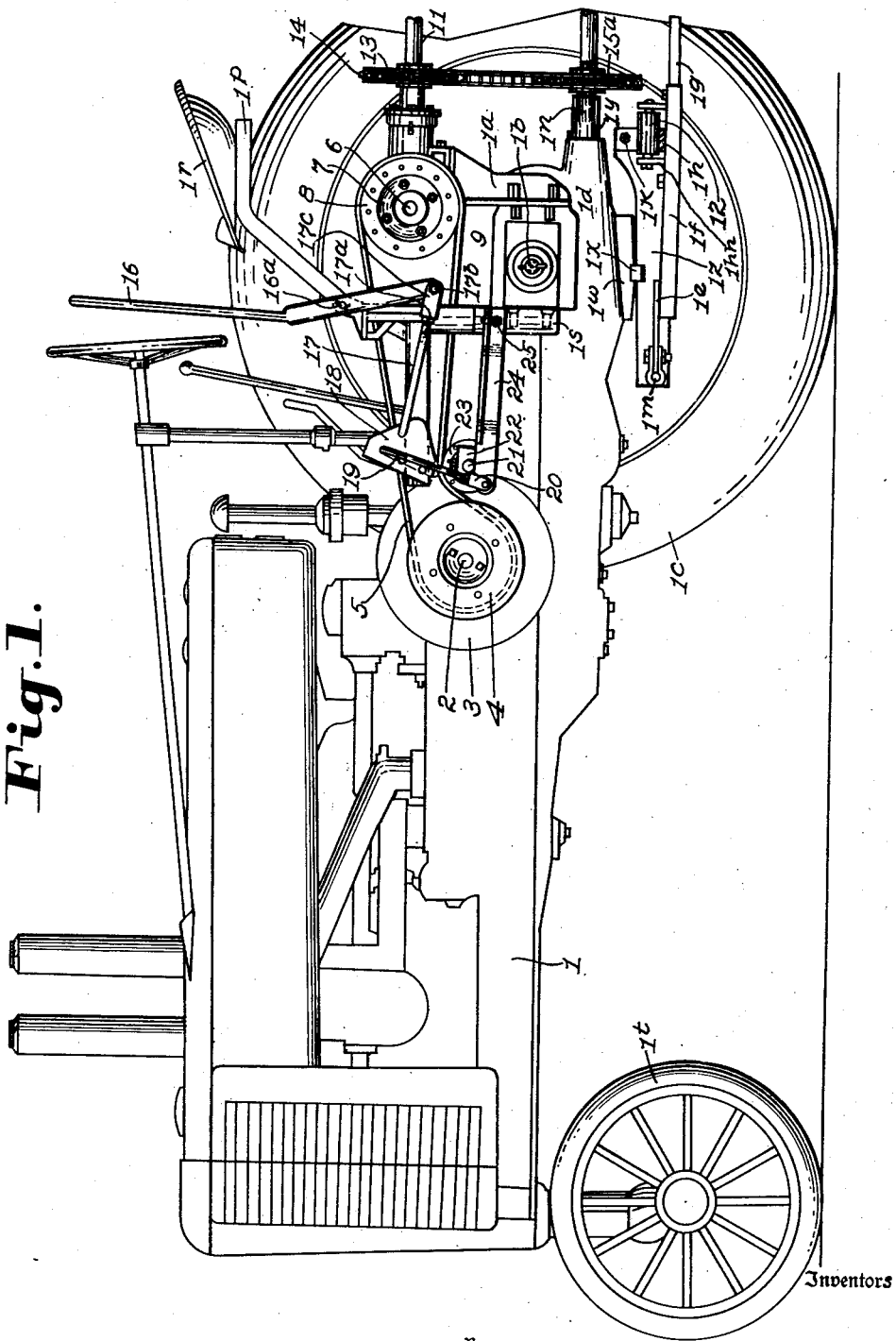
Figure 2:
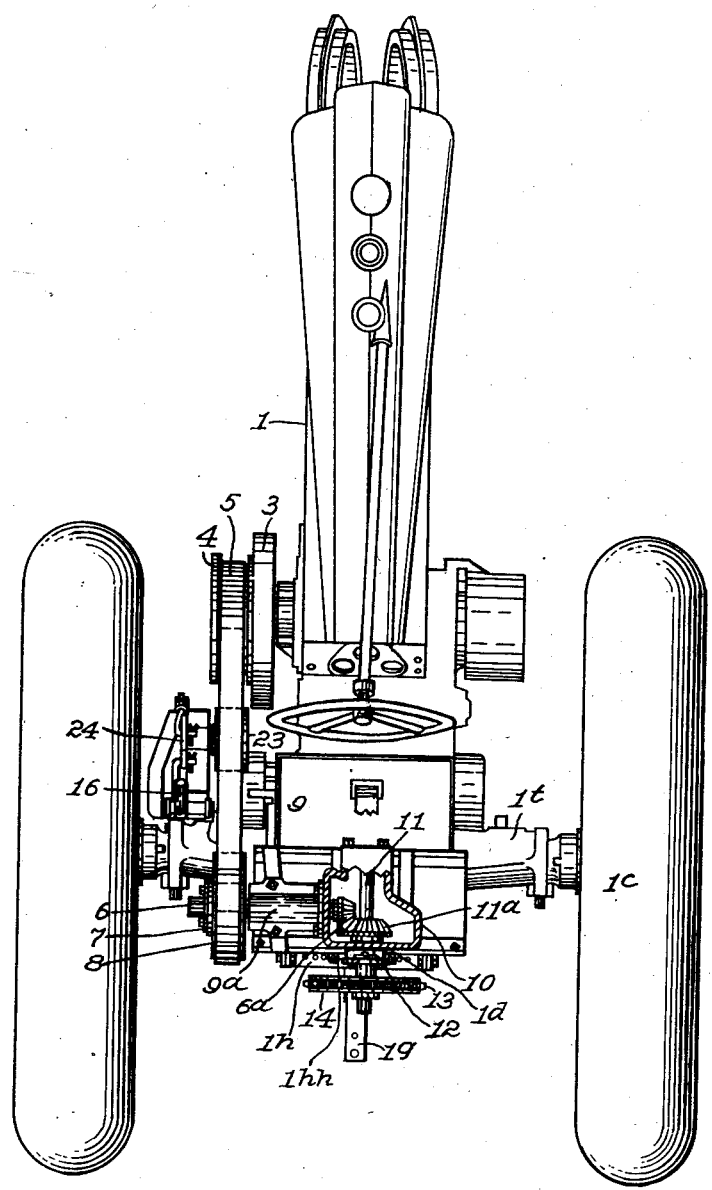
Figure 3:
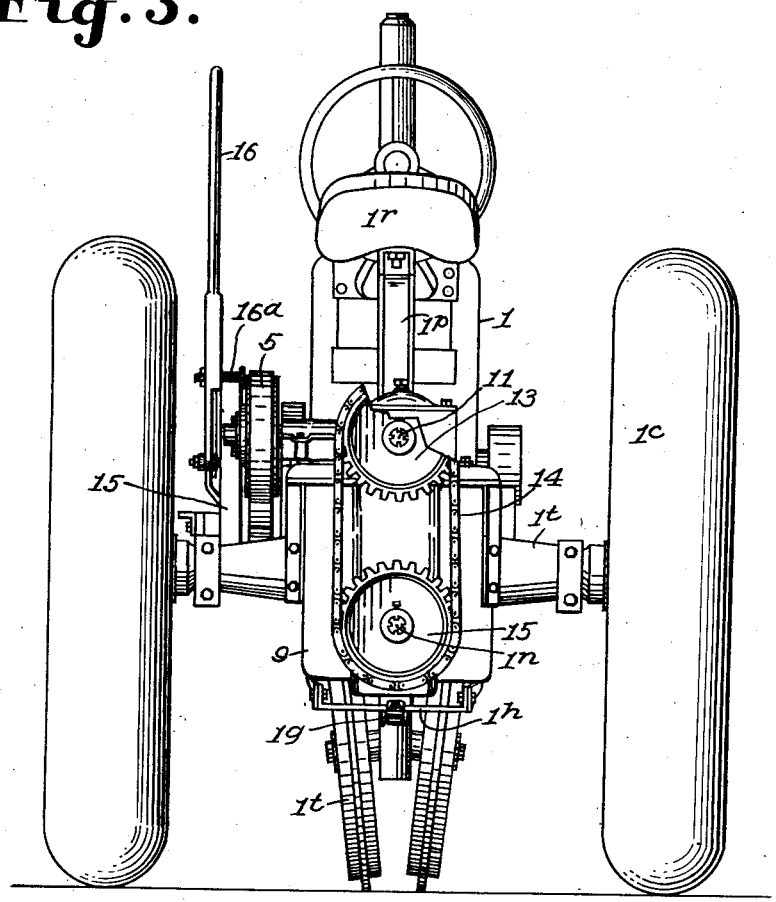
Figure 4:
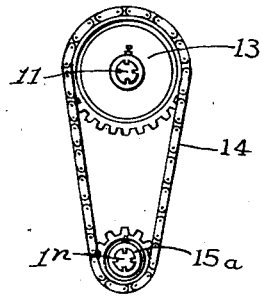

Fig. 1 is a side elevation showing my improvements as mounted on the tractor. Fig. 2 is a top plan thereof. Fig. 3 is a rear elevation thereof, and Fig. 4 is a detail rear elevation of the chain driven sprocket gears.

The tractor shown in Fig. 1 also shows certain elements thereof by numbers, the train thereof with exponents or without, through the complete assemblage.

Our improvements are therefore represented by heavier lines than the lines appropriated to the main tractor apparatus. The tractor proper has the travelling wheels 1t in front carrying a body 1, together with a rear pair of wheels of greater diameter at 1c, driven together with axle means 1b housed in sleeves 1t and in side bearings in a boxing 9. A housing part of the frame has a depending casing 1w with inturned lugs 1x engaged with a rearwardly directed body 1z. On each side are spring arms 1e with eyed forward parts mounted on cross-pins 1m and resting on arms 1f which support thereacross bar 1h with upturned ends hung on bolts 1k. As shown in Fig. 2, bolt-holes are alined along the bar 1h.

The under body 1d terminates medially rearwardly to serve as a casing about a rearwardly directed sleeve 1y which is traversed by the rear end part of a shaft 1n, rotatable, and carrying removably upon its rear end a sprocket gear 15 about which is reeved the lower part of a chain-belt 14, and this belt has its upper end part reeved about a sprocket gear 13 which is removably secured on the rear end of a longitudinally directed rotary shaft 11 whose forward part traverses the rear wall of a casing 10, and is terminated by a bevel-gear 11a thereon.

In Fig. 1 is shown the rear body part 1a of the tractor body secured by screws to the casing 9, and having said casing 10 fixed thereon. A bipartite sleeve 9a, laterally directed, is end-connected to the casing 10 and seats therethrough the lateral shaft 6 which also traverses the casing 10 and this shaft carries within the casing a like bevel gear 6a in mesh with the other bevel gear 11a. Without the rear wall of said casing 10 a roller 12 is supported, to ride along the member 1h between adjustable bolts therethrough, which bolts thus permit a traction hitch member 1g to be adjustably shifted to and fro laterally on the member 1h, as desired in the positioning of the hitch to be used in hauling a following wheeled mechanism (not shown) in adjusting the hitch laterally.

Referring to said Fig. 1, the numeral 2 denotes a laterally disposed driving shaft operated by and controlled by the motor of the tractor, and carrying the usual fly-wheel 3. The shaft 2 projects outwardly laterally to further seat thereon a flanged belt-wheel 4. The said lateral shaft 6 has a belt wheel 9 mounted thereon, and a normally loose belt 5 is reeved about said wheels 3 and 8. The belt wheel 8 also has a circular end-clamping device 7 with bolts to secure it to the wheel, and the wheel is fixed on the shaft 6.

A driver's seat 1r is mounted on an angular arm 1p rearwardly directed and fixed on a post 1s secured on the body part 9 of the tractor. A forwardly directed arm 24 is end-pivoted on said post by a bolt 25. Means are provided for the manual control of the arm 24 by the driver on the seat 1r.

On the forward end of the arm 24 is pivoted the forked head 20 adjustably secured upon the lower end of a link-rod 19, whose upwardly directed end part is bent laterally and inserted in a hole through the upper end part of a pentagonal plate 18 loosely. Another rod 17 likewise has an end part bent laterally and also seated loosely in another hole in the plate 18, the rod being positioned angularly rearwardly relative to the first arm 19, and the rod 17 carries at its rear end a forked head 17c adjustably on a terminal thread, the head 17c being adjustably stopped on the thread by a nut 17a. An arm 16, elongated upwardly, is pivoted medially by a pivot 16a, the upper part of the arm 16 being directed upwardly and slightly bent rearwardly, also diminished for use by a driver on the seat 1r. The lower end of the arm 16 is pivoted by a bolt between the parts of the forked head 17c, and angularly disposed relative to the medial rod 17. The arm 16 is pivoted on a bolt 16a to the lower sloping end part of the arm 1p.

A bearing block 22 is fixed on the inner face of the forward end of the rock-arm 24, and is apertured to seat rotatably a short stem 21 therethrough and carries on its inner end a peripherally channeled tread wheel 23 loosely embracing the lower reach of the belt 5 normally to leave the belt slack. In operation, the driver on the seat 1r, may shift the arm 16 forwardly, whereby the train of linkages above described to swing upwardly the arm 24, whereby the rimmed wheel 22 is caused to embrace the belt 5 tensionally, the belt and the wheels 4 and 8 being placed in rotation, the angle-gears 6a and 11a being rotated by the linked chain 14 carried by the sprocket gears 13 and 15, the latter rotating its shaft 1n, and the latter adapted to rotate in turn the assembly of gears in the rear compartment of the tractor casing and not shown herein, to communicate rotation to the tractor wheels 1c.

In Fig. 3, the sprocket gears 13 and 15 are of like shape and diameters. In Fig. 4, the upper sprocket gear 13 is of greater diameter than the lower sprocket gear 15a, hence the shaft 1n is driven at higher speed. The two wheels 13 and 15a may be relatively inverted, to drive the gear 15a and its shaft at a higher rate of speed, and whereby, adjustments may be effected for three speeds of the shaft 15a as also the wheels 1c. The shaft 1n is driven by means of a train of coacting gears and a motor therefor within the housing, but not shown in the drawings. One feature of the applicant's invention is the provision of an additional gear ratio for driving the tractor, and another feature is the make and break combinations of elements from the shaft 2 to the hand lever 16, whereby the driver may slacken the belt 5 to let it idle without breaking the connections between the shaft 1n, and a driving shaft in the rear, of a fertilizer distributor or other trailing mechanism.

We claim:

1. In combination in a tractor, a lateral drive-shaft having a belt-wheel thereon, a second belt-wheel spaced rearwardly therefrom and having a shaft extending inwardly transversely with a bevel gear thereon, a longitudinal medial drive-shaft mounted on the rear part of the tractor and having a bevel gear thereon in mesh with the first bevel gear, a sprocket gear mounted also on the medial drive-shaft and to the rear of the tractor body, a sprocket gear mounted on the rear end of a driven shaft supported rotatably on said body, a drive-chain reeved around said sprocket gears, a belt loosely reeved around said belt-wheels, a hand-lever medially pivoted on the tractor, a rock-arm end-mounted on the tractor, interlinking connections between the lower part of the hand-lever and the free end of the rock-arm, and a roll mounted rotatably on the free end of the rock-arm and positioned to bear against the lower reach of said belt to tension it when the upper part of the hand-lever is rocked forwardly, releasably.

2. Speed adjusting means adapted to be mounted removably on a tractor, comprising a lateral drive-shaft having a belt-wheel thereon, a second belt-wheel spaced rearwardly therefrom and having a shaft extending inwardly transversely with a bevel gear thereon, a longitudinal medial drive-shaft mounted on the rear part of the tractor and having a bevel gear thereon in mesh with the first bevel-gear, a sprocket gear mounted also on the medial drive-shaft and to the rear of the tractor body, a sprocket gear mounted on the rear end of a driven shaft supported rotatably on said body, a drive-chain reeved around said sprocket gears, a belt loosely reeved around said belt-wheels, a hand-lever medially pivoted on the tractor, a rock-arm medially pivoted on the tractor, interlinking connections between the lower part of the hand-lever and the free end of the rock-arm comprising a forwardly directed rod having its rear end pivoted to the lower end of the hand-lever, ano r rod pivoted at its lower end to said rock-arm and projecting upwardly, a rock-plate having forwardly spaced bearing holes, the free ends of said rods being bent angularly and loosely traversing said bearing holes, and a roll mounted rotatably on the free end of the rock-arm and positioned to bear against the lower reach of said belt to tension it when the upper end of the hand-lever is rocked forwardly.

3. In combination in a tractor, a lateral drive-shaft having a belt-wheel thereon, a second belt-wheel spaced rearwardly therefrom and having a shaft extending inwardly transversely with a bevel-gear thereon, a belt reeved around said belt-wheels, a longitudinal medial drive-shaft mounted on the rear part of the tractor and having a bevel-gear thereon in mesh with the first bevel-gear, a sprocket gear mounted also on the medial drive-shaft and to the rear of the tractor body, a sprocket gear mounted on the rear of a driven shaft supported on said body, a drive-chain reeved around said sprocket gears, the sprocket gears being of different diameters, and interchangeable relative to each other, and manually controllable means including a roller adapted at times to tension a belt reeved around said belt-wheels.

4. A belt-wheel adapted to be rotatably mounted on a tractor, a second belt-wheel spaced rearwardly therefrom and having a shaft extending inwardly transversely with a bevel-gear thereon, a longitudinal medial drive-shaft mounted on the rear part of the tractor and having a bevel-gear thereon in mesh with the first bevel-gear, a belt-wheel mounted on said medial drive-shaft, another belt-wheel mounted rotatably on the rear part of the tractor and beneath the first belt-wheel, said belt-wheels being of differing diameters and adapted to be reversely changed in relative position, for varying the speed thereof, a belt between the belt wheels, and a belt reeved around said wheels, a belt reeved around the first-mentioned belt-wheels, and linked devices mounted on the tractor for manual operation in loosening or tightening said latter belt.

5. A speed changing mechanism adapted to be mounted on a tractor, comprising in combination with a rotary shaft mounted on the tractor and carrying a belt-wheel thereon, a second belt-wheel mounted also on the tractor, a belt reeved about said belt-wheels, the second belt-wheel having a shaft also mounted on the tractor, vertically spaced horizontal rotary shafts mounted on the tractor, driving connections between the upper shaft and the second belt-wheel, another shaft rotatably mounted on the tractor, a spaced pair of sprocket-wheels mounted removably on said vertically spaced shafts, said pair of sprocket-wheels being of different diameters, and a sprocket-chain reeved about said sprocket-wheels, whereby the sprocket-wheels may be interchanged upon the vertically spaced shafts to vary the speed of rotation of the lower shaft.

ERIC M. McELHINNEY.
JAMES A. PODHAJSKY.